United States Patent [19]

Baba

[11] Patent Number: 4,467,667
[45] Date of Patent: Aug. 28, 1984

[54] FITTING STRUCTURE OF STEERING WHEEL MECHANISM

[75] Inventor: Masanao Baba, Takarazuka, Japan

[73] Assignee: Nippon Cable System, Inc., Hyogo, Japan

[21] Appl. No.: 348,152

[22] Filed: Feb. 11, 1982

[51] Int. Cl.³ ............................................... B62D 1/18
[52] U.S. Cl. ..................................... 74/493; 280/775; 403/4; 403/160
[58] Field of Search .............. 74/493; 280/775; 403/4, 403/160

[56] References Cited

U.S. PATENT DOCUMENTS

| 3,269,210 | 8/1966 | Steele, Jr. et al. | 180/90 X |
| 3,487,712 | 1/1970 | Steiner | 74/493 |
| 3,934,488 | 1/1976 | Cantley | 74/493 |
| 3,964,344 | 6/1976 | Horvath et al. | 74/422 |

Primary Examiner—Allan D. Herrmann
Attorney, Agent, or Firm—Armstrong, Nikaido, Marmelstein & Kubovcik

[57] ABSTRACT

A fitting structure for a steering wheel mechanism to a dashboard comprising a flange provided to a top portion of a casing of the steering wheel mechanism, having a vertical plane and an slant plane on a front side and a reverse side, respectively, and clamping bores perforated perpendicularly to the vertical plane at an angle with respect to the slant plane; a C-shaped setting holder interposed between the slant plane of the flange and that of the dashboard; at least two bolts inserted through said clamping bores and arranged at reverse side of the dashboard; and a U-shaped clamping plate for clamping the dashboard with said flange and said mounting holder by said bolts.

2 Claims, 7 Drawing Figures

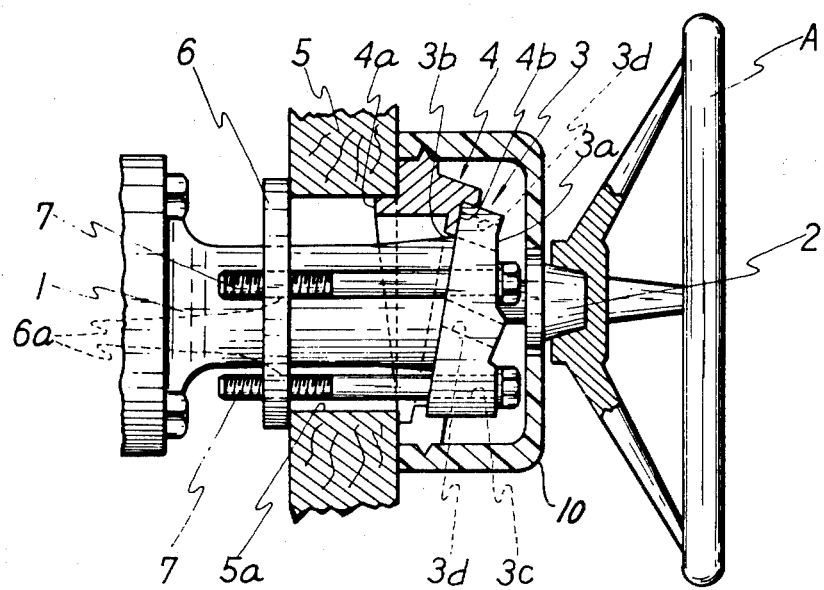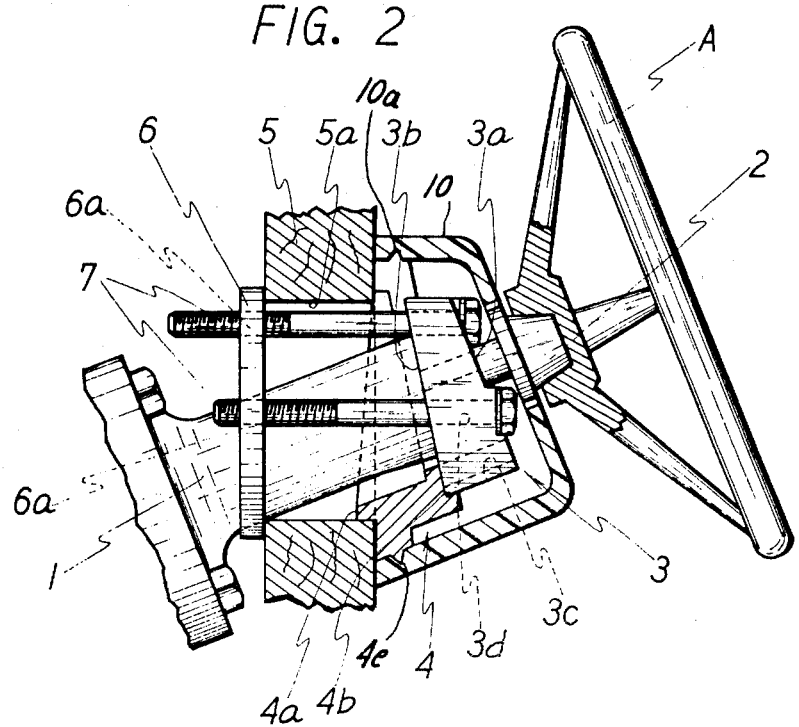

FITTING STRUCTURE OF STEERING WHEEL MECHANISM

BACKGROUND OF THE INVENTION

The present invention relates to improvements of a fitting structure for a steering wheel mechanism which is equipped to a dashboard in boat, ship, or any other vehicle.

According to the conventional method for fitting a steering wheel mechanism to the dashboard, a casing of a steering wheel shaft is secured to the dashboard from the exterior, and thereafter works for fitting and adjusting other relating mechanisms including an operational power transmission mechanism to be connected with the steering wheel shaft must be carried out in a very narrow space of a reverse side of the dashboard. Therefore, there are difficulties in the above works.

Furthermore, a change of a fitting angle also causes inconvenience in works, because the whole steering wheel mechanism must be disassembled and then again assembled with the desired angle thereof.

OBJECTS OF THE INVENTION

A main object of the invention is to provide a fitting structure for a steering wheel mechanism capable of readily fitting the steering wheel mechanism to a dashboard and further readily carrying out a change of a fitting angle.

Other objects and advantages of the invention will become apparent from the following descriptions with reference to the accompanying drawings.

BRIEF DESCRIPTION OF THE DRAWINGS

FIG. 1 is a side view for showing an embodiment of a fitting structure of the invention;

FIG. 2 is a side view for showing the fitting structure of the invention which is rearranged into the different form from FIG. 1;

DETAILED EXPLANATION OF THE INVENTION

Figure 3:
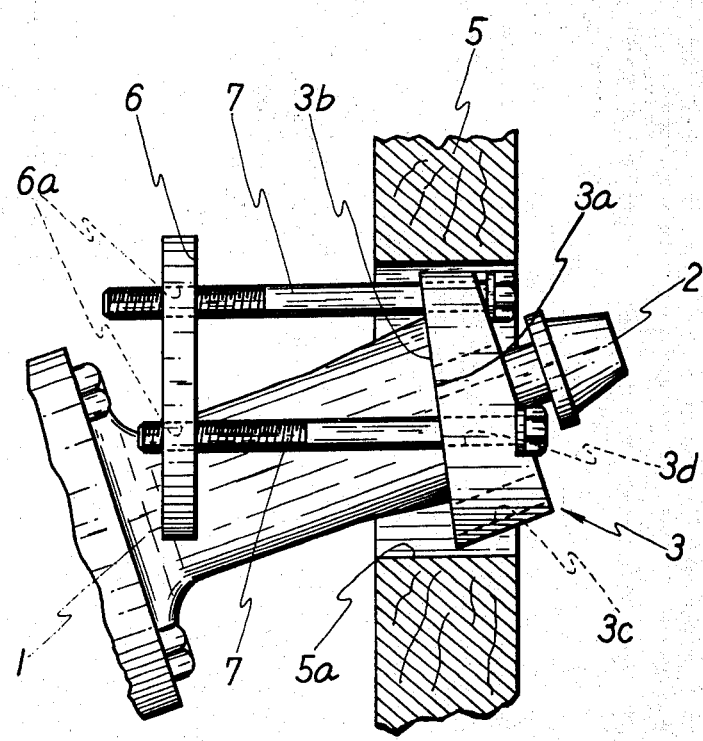
FIG. 3 is a side view for showing a process for fitting a steering wheel mechanism on a slant.
Figure 4A:
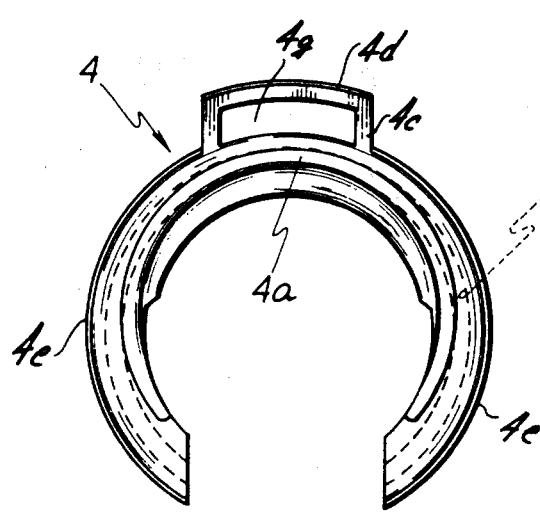
FIGS. 4a and 4b are a front view and a side view, respectively, for showing a setting holder in the invention.
Figure 4B:
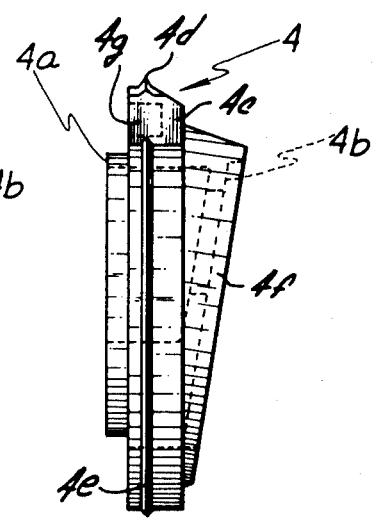
Figure 5:
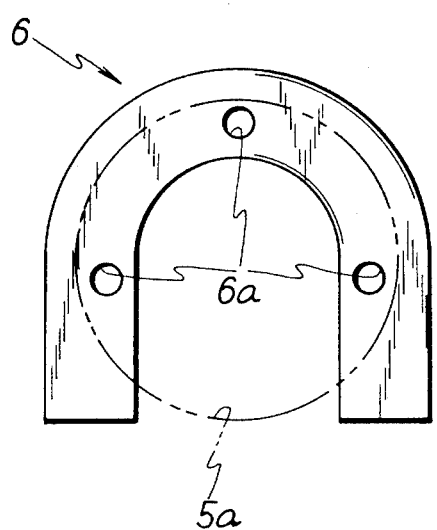
FIG. 5 is a front view for showing a clamping plate in the invention.
Figure 6:
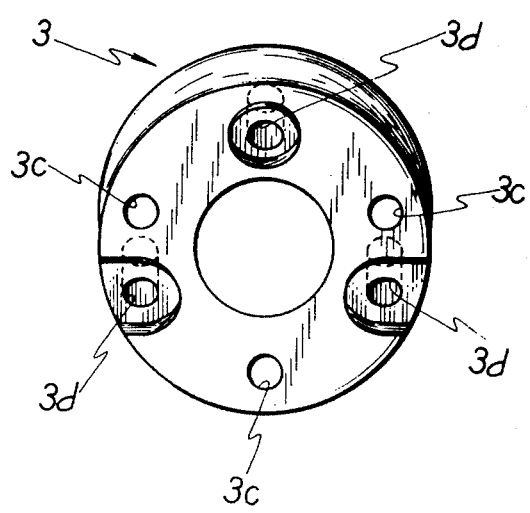
FIG. 6 is a front view for showing a flange in the invention.

In FIGS. 1 to 3, A is a steering wheel. 2 is a steering wheel shaft which is rotatably supported by a casing 1. 3 is a flange (shown in FIG. 6 in detail) provided to a top end portion of the casing 1. 3a is a vertical plane of the flange 3. The vertical plane is provided vertically in the axial direction of the steering wheel shaft. 3b is a slant plane of the flange 3. The flange 3 is provided with vertical clamping bores 3c and slant clamping bores 3d. The vertical clamping bores 3c are perforated substantially perpendicularly to the vertical plane 3a and the slant clamping bores 3d are perforated at an angle to the slant plane 3b. 4 is a setting holder (shown in FIGS. 4a to 4b in detail) which can maintain the suitable fitting angle by interposing between the dashboard 5 and the flange 3. At one side of the setting holder 4, an arc-shaped projection 4a which can be engaged with a mounting bore 5a of the dashboard 5 is provided. At the other side of the setting holder, a concave groove 4b onto which the slant plane of the flange 3b can be inserted is provided. The flange 3 and setting holder 4 are enclosed within a cover 10. 6 is a nearly U-shaped clamping plate (shown in FIG. 5 in detail). The clamping plate is provided with screw bores 6a into which screw portions of clamping bolts 7 can be screwed through the clamping bore 3c or 3d or the flange 3.

Hereinafter, the functions and advantages of the fitting structure of the invention will be explained.

In order to fit the steering wheel A to the dashboard 5, the mounting bore 5a through which only the flange 3 can pass is perforated to the dashboard 5. In case that the steering wheel mechanism which is combined with an operational power transmission mechanism (not shown) and other relating mechanisms are fitted vertically to the dashboard, clampling bolts 7 are inserted through the vertical clamping bores 3c (perforating in parallel with the axial direction) of the flange 3, the top screw portions of the clamping bolts are suitably screwed into screw bores 6a perforated to the clamping plate 6, the flange 3 is inserted into the mounting bore 5a of dashboard 5 and the flange 3 is projected from the front side (the right side in FIG. 1) of the dashboard 5. Furthermore, the C-shaped setting holder 4 provided with the same slant plane 3b as that of the flange 3 is inserted into the gap between the flange 3 and dashboard, and the clamping bolts 7 are clamped. Then the fitting work is carried out and the steering wheel A is secured to dashboard 5 vertically as shown in FIG. 1.

As described above, the fitting structure of the invention has advantages that before the steering wheel mechanism is fitted to the dashboard, the steering wheel mechanism is connected to the casing and is adjusted in advance, and therefore the works become extremely easy.

In case that the steering wheel A is equipped on the slant, a clamping bolts 7 are inserted through the slant clamping bores 3d (perforated neary vertically to the slant plane 3b), the top screw portions of the clamping bolts are screwed into screw bores 6a of the almost U-shaped clamping plate 6, the flange 3 is inserted into the mounting bore 5a from the reverse side of the dashboard 5 as shown in FIG. 3 and the flange 3 is projected from the front side (the right side in FIG. 2) of the dashboard 5. Furthermore, the steering wheel A can be fitted to the dashboard on the slant as shown in FIG. 2 by inserting the setting holder 4 provided with the slant plane of the suitable slant angle into the gap between the flange 3 and the dashboard 5, and clamping the clamping bolts 7. Therefore, in the similar manner to the vertical fitting, the fitting work is extremely easy, because the works are performed only by rearranging the clamping bolts and the clamping plate.

Furthermore, in the fitting structure of the invention, since the desirable fitting angle can be obtained by the combination of the slant planes, the fitting frequently tends to become unstable due to slipping the slant planes together when the clamping bolts are clamped. In order to prevent such a defect, the arc-shaped projection 4a is provided to the side surface of the setting holder 4 to be contacted with the mounting bore 5a of the dashboard so as to secure the engagement of the set holder 4 and the mounting bore 5a.

Also, due to the concave groove 4b provided in the other side surface of the setting holder 4 of which one side surface is attached to the flange, the dashboard, the setting holder 4 and the flange 3 are fixed securely to each other.

The setting holder 4 has an annular V-shaped projection 4e which mates with a V-shaped groove 10a in cover 10. The setting holder 4 has an upper portion 4c.

As described above, because in this fitting structure of the invention the casing is fitted from the the reverse side of the dashboard, the steering wheel can be fitted to the dashboard after the works of the connection and adjustment of the operational power transmission mechanism to the steering wheel shaft has carried out. Therefore, the fitting structure of the steering wheel mechanism of the invention is extremely practical in light of excellent advantages that the works in narrow space of the side reverse of the dashboard are not necessary.

What is claimed is:

1. A fitting structure for a steering wheel mechanism to a dashboard comprising:
   a casing:
   a flange provided to a top end of said casing, having a slant plane with a suitable angle against the axial direction of a steering wheel shaft, having at least two vertical clamping bores perforated in parallel with the axial direction of said shaft, and having at least two slant clamping bores perforated at an angle to said slant plane;
   a nearly C-shaped setting holder partially cut away, interposed between the slant plane of said flange and said dashboard, and having a suitable slant plane;
   at least two clamping bolts inserted through said clamping bores of the flange;
   a nearly U-shaped clamping plate provided with screw bores in which top portions of said clamping bolts can be screwed.

2. A fitting structure of claim 1 wherein said setting holder is provided with an arc-shaped projection for engaging with a mounting bore of the dashboard at one side of said mounting holder, and is provided with a concave groove for inserting the slant plane of the flange at the other side.

* * * * *